(12) United States Patent
Halper

(10) Patent No.: US 11,970,041 B2
(45) Date of Patent: Apr. 30, 2024

(54) ADJUSTABLE AIR CHAMBER FOR A SHOCK

(71) Applicant: Fox Factory, Inc., Braselton, GA (US)

(72) Inventor: Jeff Halper, Santa Cruz, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

(21) Appl. No.: 16/797,939

(22) Filed: Feb. 21, 2020

(65) Prior Publication Data

US 2020/0269648 A1 Aug. 27, 2020

Related U.S. Application Data

(60) Provisional application No. 62/809,473, filed on Feb. 22, 2019.

(51) Int. Cl.
| | |
|---|---|
| *B60G 17/08* | (2006.01) |
| *B60G 13/06* | (2006.01) |
| *B60G 13/10* | (2006.01) |
| *F16F 9/02* | (2006.01) |
| *F16F 9/19* | (2006.01) |
| *F16F 9/44* | (2006.01) |
| *F16F 9/46* | (2006.01) |
| *F16F 9/516* | (2006.01) |

(52) U.S. Cl.
CPC .............. *B60G 17/08* (2013.01); *B60G 13/06* (2013.01); *B60G 13/10* (2013.01); *F16F 9/0218* (2013.01); *F16F 9/19* (2013.01); *F16F 9/44* (2013.01); *F16F 9/466* (2013.01); *F16F 9/516* (2013.01); *B60G 2202/242* (2013.01); *B60G 2206/41* (2013.01); *B60G 2500/11* (2013.01); *B60G 2800/162* (2013.01); *F16F 2228/066* (2013.01)

(58) Field of Classification Search
CPC ........ B60G 17/08; B60G 13/06; B60G 13/10; B60G 2202/242; B60G 2206/41; B60G 2500/11; B60G 2800/162; F16D 9/44; F16D 9/516; F16D 2228/066
See application file for complete search history.

(56) References Cited

U.S. PATENT DOCUMENTS

| | | | | |
|---|---|---|---|---|
| 4,798,398 A | * | 1/1989 | Cummins ............ | B60G 21/073 280/124.159 |
| 4,958,706 A | * | 9/1990 | Richardson ............. | F16F 9/096 188/277 |
| 4,972,928 A | * | 11/1990 | Sirven ..................... | F16F 9/466 188/269 |
| 5,141,244 A | * | 8/1992 | Clotault ................. | B60G 17/08 280/124.102 |
| 5,775,677 A | * | 7/1998 | Englund ................ | B60G 13/06 188/317 |
| 5,924,528 A | * | 7/1999 | Vermolen ................ | F16F 9/46 188/266.1 |

(Continued)

*Primary Examiner* — Robert A. Siconolfi
*Assistant Examiner* — James K Hsiao

(57) ABSTRACT

A volume adjustable air chamber for a shock assembly is disclosed herein. The adjustable air chamber assembly includes a first air chamber and a second air chamber in fluid communication via a flow path. A check valve is coupled with the flow path, the check valve that allows the second air chamber to be fluidly coupled with or fluidly isolated from the first air chamber, such that the available volume of air for said first air chamber can be modified to provide different damping characteristics.

20 Claims, 5 Drawing Sheets

(56) References Cited

U.S. PATENT DOCUMENTS

| | | | | |
|---|---|---|---|---|
| 5,975,508 | A * | 11/1999 | Beard | B60N 2/501 |
| | | | | 180/89.12 |
| 8,074,974 | B2 * | 12/2011 | Nogami | B60G 17/08 |
| | | | | 267/64.17 |
| 8,573,606 | B1 * | 11/2013 | Kim | B60G 17/08 |
| | | | | 280/124.157 |
| 8,857,580 | B2 * | 10/2014 | Marking | F16F 9/19 |
| | | | | 188/313 |
| 9,168,980 | B1 * | 10/2015 | Falck | B63B 17/0081 |
| 9,228,630 | B2 * | 1/2016 | Coaplen | F16F 9/3257 |
| 2006/0181034 | A1 * | 8/2006 | Wilde | B60G 15/12 |
| | | | | 280/124.16 |
| 2010/0181709 | A1 * | 7/2010 | Laird | B60G 15/12 |
| | | | | 267/218 |
| 2011/0215551 | A1 * | 9/2011 | Galasso | F16F 9/02 |
| | | | | 280/276 |
| 2013/0118847 | A1 * | 5/2013 | Krahenbuhl | F16F 9/062 |
| | | | | 188/313 |
| 2013/0134687 | A1 * | 5/2013 | Laird | F16F 9/0236 |
| | | | | 267/64.11 |
| 2014/0288776 | A1 * | 9/2014 | Anderson | B60G 13/14 |
| | | | | 701/37 |
| 2015/0377316 | A1 * | 12/2015 | Roessle | B60G 13/02 |
| | | | | 188/315 |
| 2016/0230830 | A1 * | 8/2016 | Haller | F16F 9/185 |
| 2017/0037923 | A1 * | 2/2017 | Sirven | B60G 17/08 |
| 2017/0182917 | A1 * | 6/2017 | Taylor | B60N 2/522 |
| 2017/0246927 | A1 * | 8/2017 | Laird | F16F 9/0236 |
| 2018/0313423 | A1 * | 11/2018 | Laird | F16F 9/0281 |
| 2019/0136932 | A1 * | 5/2019 | Deferme | F16F 9/185 |
| 2019/0248204 | A1 * | 8/2019 | Laird | F16F 9/0236 |

\* cited by examiner

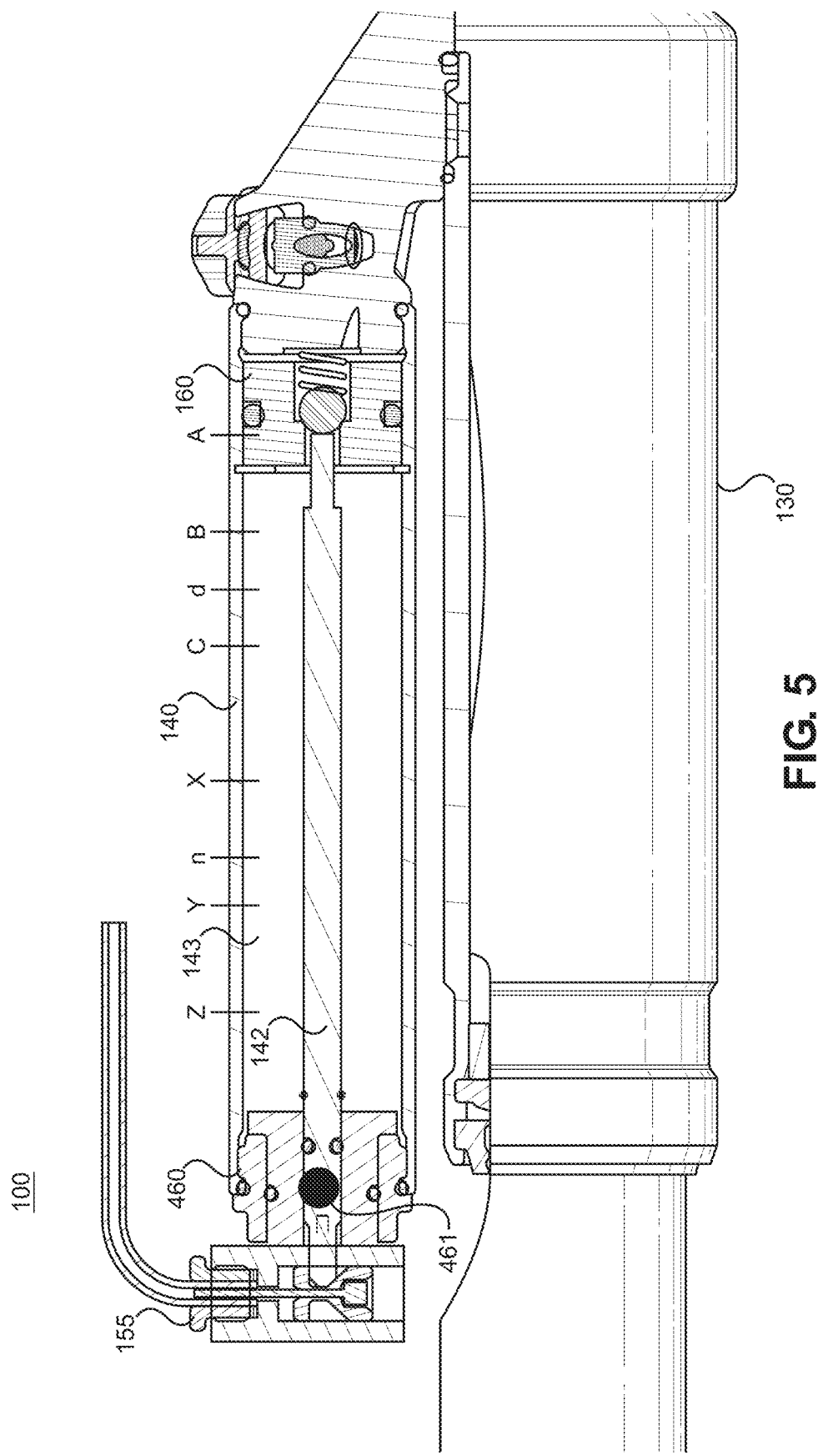

ADJUSTABLE AIR CHAMBER FOR A SHOCK

CROSS-REFERENCE TO RELATED APPLICATIONS (PROVISIONAL)

This application claims priority to and benefit of U.S. Provisional Patent Application No. 62/809,473 filed on Feb. 22, 2019, entitled "ADJUSTABLE AIR CHAMBER FOR A SHOCK" by Jeff Halper, and assigned to the assignee of the present application, the disclosure of which is hereby incorporated by reference in its entirety.

FIELD OF THE INVENTION

Embodiments of the invention generally relate to an adjustable air chamber assembly for a shock or damper.

BACKGROUND

Presently, there is no way to change the size of an existing air chamber without taking the chamber apart to insert spacers or other similar volume consuming items.

BRIEF DESCRIPTION OF THE DRAWINGS

Aspects of the present invention are illustrated by way of example, and not by way of limitation, in the accompanying drawings, wherein:

FIG. 5 is a cut away view of shock including the Evol chamber and showing the location adjustable check valve and the location adjustable end cap in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

The present embodiments utilize an extra volume (Evol) chamber in the suspension component to allow the available air volume to be changed on the fly, e.g., while the vehicle is in operation. In one embodiment, the change can be performed by the user manually (e.g., the user adjusting a lever, turning a knob, on the shock or in another location that is manually connected to the shock (such as via a cable from a lever on the handlebars, or the like). In one embodiment, the change can be performed by the user electronically (e.g., via an electronic connection such as a switch on the handlebars, or the like) via a wired or wireless connection. In one embodiment, the change can be performed automatically by a live system on or connected with the vehicle. In one embodiment, the change to the air volume can be made by an automated system, while also receiving input from the user manually and/or electronically.

Figure 1:
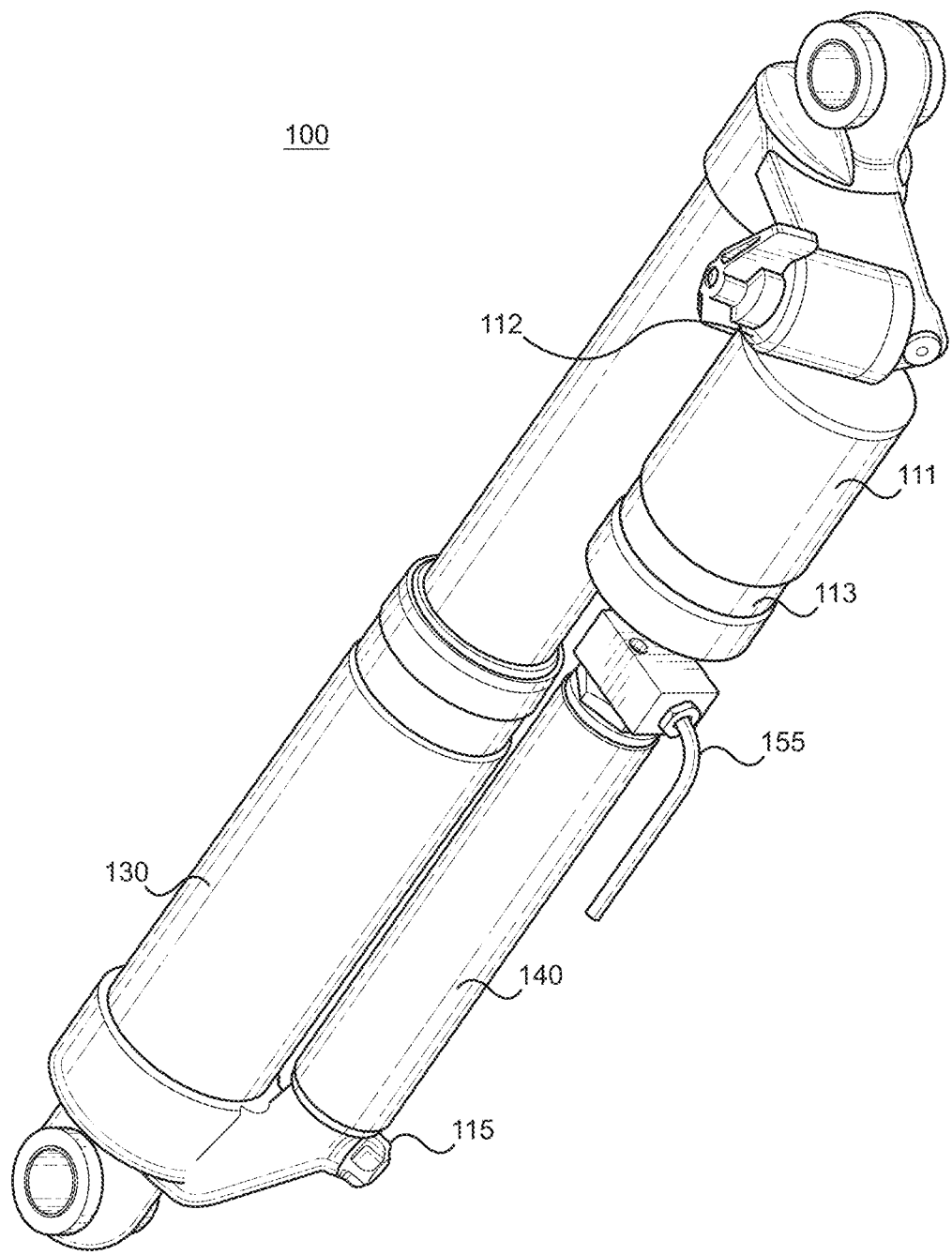
FIG. 1 is an orthogonal view of a shock including an Evol chamber in accordance with an embodiment.

With reference now to FIG. 1, an orthogonal view of a shock 100 having an extra volume (Evol) chamber in accordance with an embodiment. In one embodiment, shock 100 includes an optional reservoir 111, an optional decal 113, an optional base valve 112, a Shrader valve 115, a primary air chamber 130, an Evol chamber 140, and an actuator 155. Shrader valve 115 is used to add or remove air to increase or decrease the air pressure in the primary air chamber 130 and/or Evol chamber 140. In one embodiment, the volume of primary air chamber 130 is much smaller than the volume of Evol chamber 140 such that the capability to stiffen the air portion of shock 100 by closing off Evol chamber 140 is significant. In one embodiment, Evol chamber 140 is piggybacked to the shock 100.

Figure 2:
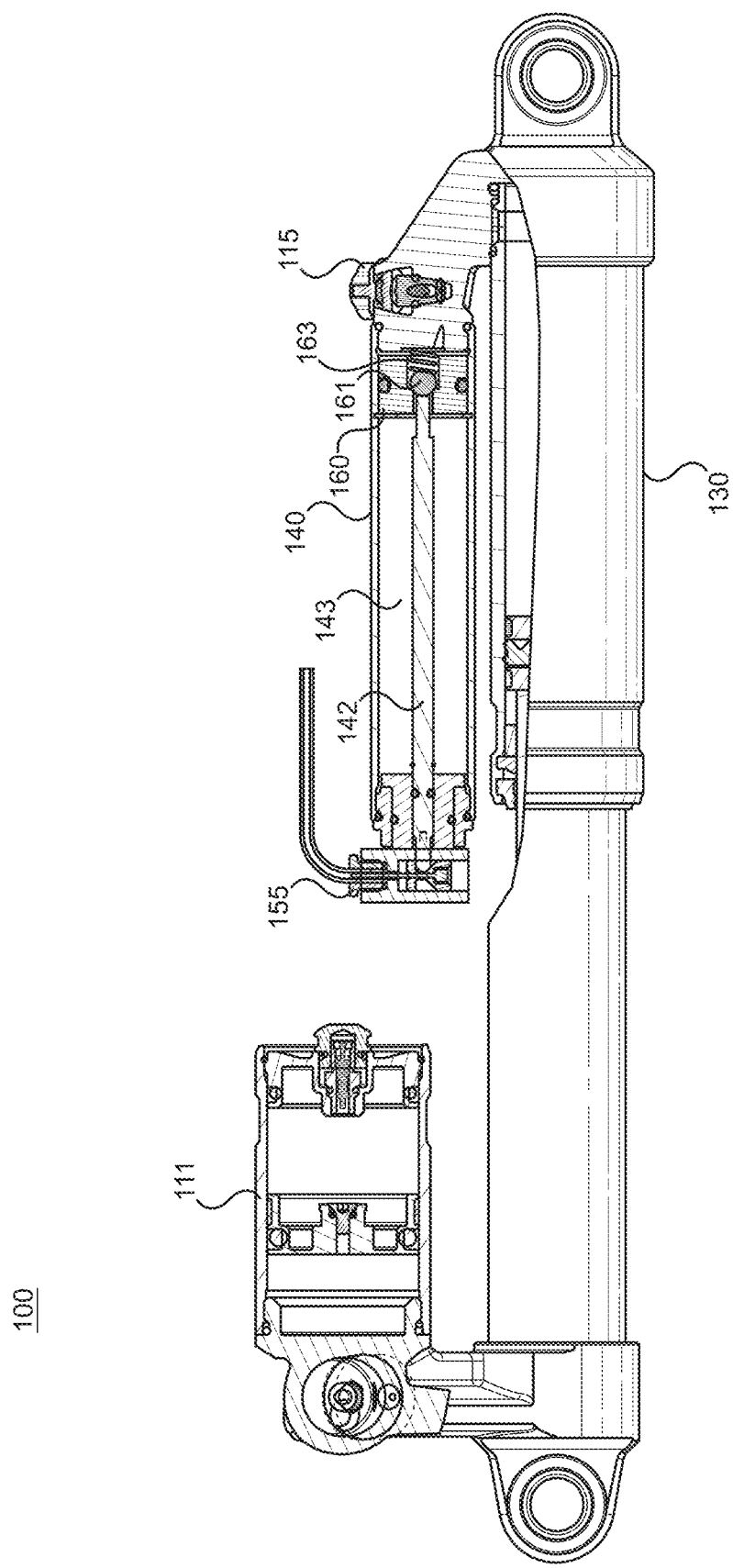
FIG. 2 is a cut away view of shock including the Evol chamber and showing a check valve in accordance with an embodiment.

Referring now to FIG. 2, a cut away view of shock 100 including the Evol chamber 140 and a check vale 160 is shown in accordance with an embodiment. In one embodiment, Evol chamber 140 includes a check valve 160, a rod 142, an additional air volume 143, and an actuator 155. In one embodiment, actuator 155 can be a cable actuator, an electronic motor, a solenoid, an automated control, and the like. In one embodiment, check valve 160 is a ball spring check valve 160. Although a ball spring check valve is shown, it should be appreciated that check valve 160 could be another type of valve such as an intelligent quick switch (IQs) such as a stepper motor adjustable valve, an electronic valve, a gate valve, or the like. Although different valves are also options, for purposes of clarity a ball spring check valve 160 is shown in the Figures.

In one embodiment, the check valve 160 is a valve that either allows air flow in both directions (e.g., open) or only allows air to flow in one direction (e.g., closed). In so doing, even if the check valve 160 is closed when the shock is under significant load, the air flow is only closed in the direction of additional air volume 143 (e.g., to the left). Thus, even when the check valve 160 is closed, the air can flow from additional air volume 143 into the operational shock. For example, if the actuator 155 closes check valve 160 while under a heavy load, any time the load is reduced (such that there is a higher air pressure in additional air volume 143) the higher air pressure can flow through the check valve 160 into the shock 100 (e.g., to the right). As such, adjustments by actuator 155 do not need to be made while there is no load on the suspension.

In one embodiment, the adjustment to the available volume of the Evol chamber 140 is a two-volume option. An adjustment to actuator 155 causes rod 142 to move axially to open or close the check valve 160. When rod 142 is moved to the right, the check valve 160 is closed and the amount of available volume in the Evol chamber 140 is reduced which results in a stiffer setting for the damper. When rod 142 is moved to the left, the check valve 160 is opened and the additional amount of volume in the Evol chamber 140 is made available, thereby resulting in a softer setting for the damper.

In other words, the opening of check valve 160 allows for the use of the entire Evol chamber 140 while the closing of check valve 160 stops the use of the additional air volume 143 of the Evol chamber 140 from being used. For example, the additional air volume 143 in Evol chamber 140 volume is closed off when the check valve 160 is closed and is available when the check valve 160 is open. In one embodiment, the check valve 160 is closed when rod 142 is moved to the right and the ball 161 within check valve 160 compresses the spring 163 and closes the flow path to additional air volume 143. In contrast, the check valve 160 is opened when rod 142 is moved to the left and the ball 161 within check valve 160 is moved by the spring 163 which opens the flow path allowing for the use of the entire Evol chamber 140 volume to include additional air volume 143.

Figure 3:
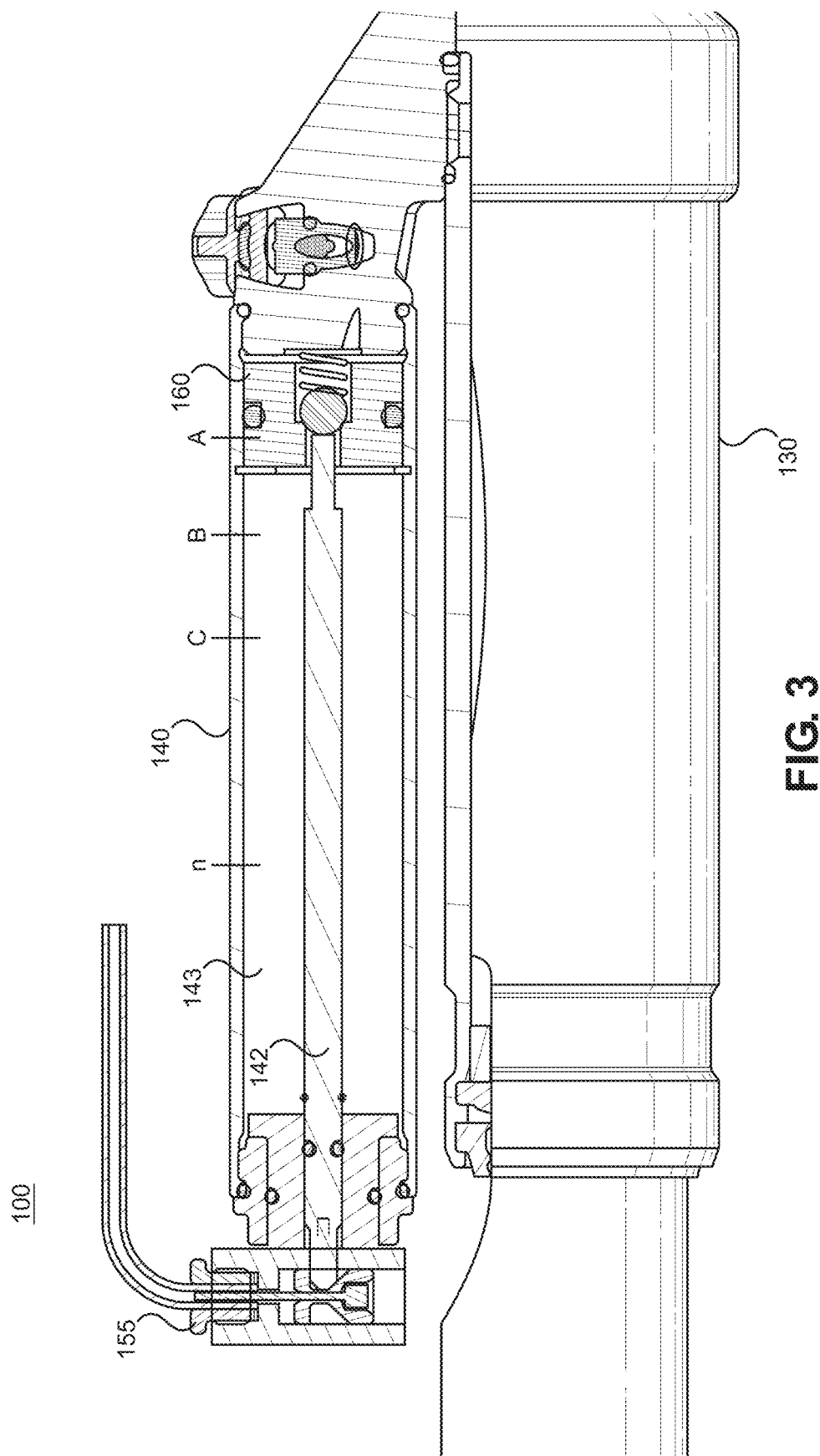
FIG. 3 is a cut away view of shock including the Evol chamber and showing a location adjustable check valve in accordance with an embodiment.

With reference now to FIG. 3, a cut away view of shock 100 including the Evol chamber 140 and a check valve 160 is shown in accordance with an embodiment. Similar to the discussion above, the adjustment to actuator 155 will adjust the available volume of Evol chamber 140 in many more than just two volume options and is made by moving check valve 160 axially along rod 142. For example, instead of using rod 142 to open or close check valve 160, the rotation of rod 142 will adjust the location of check valve 160 within Evol chamber 140. For example, in one embodiment, check valve 160 is shown in position A such that the size of additional air volume 143 is relatively large. However, if check valve 160 is moved to position B, C, or n (which could be any location along Evol chamber 140, could be preset, user configured, or the like), the size of the additional air volume 143 would be reduced while the volume to the suspension would be increased. In so doing, each different position of check valve 160 would provide different available volumes which would result in different suspension stiffness characteristics.

In one embodiment, the adjustment to actuator 155 will adjust the available volume of Evol chamber 140 to include both the moving of rod 142 to the left or right to open or close check valve 160 to allow for the use of the entire Evol chamber 140 or block access to the additional air volume 143 of the Evol chamber 140 while also rotating rod 142 (or otherwise adjusting the location of check valve 160) within Evol chamber 140 as described above. However, if a finer adjustment were desired, check valve 160 could be moved along rod 142 to position B, C, or n (which could be any location along Evol chamber 140, could be preset, user configured, or the like). In so doing, at each position the Evol chamber 140 would have a different available volume and at each position, the opening or closing of check valve 160 would provide different available volumes, which would result in different suspension stiffness characteristics.

Figure 4:
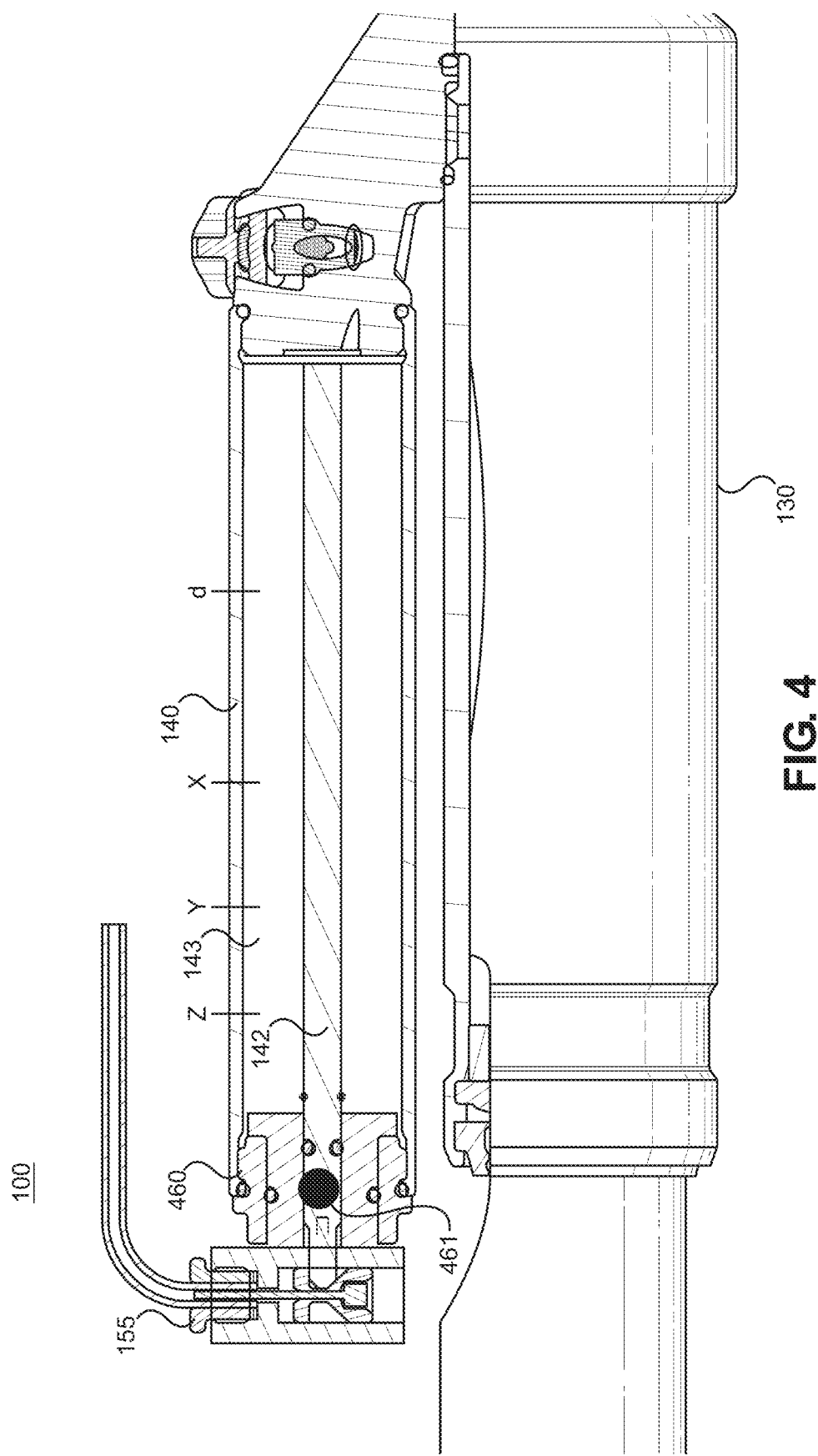
FIG. 4 is a cut away view of shock including the Evol chamber and showing the check valve and a location adjustable end cap in accordance with an embodiment.

Referring now to FIG. 4, a cut away view of shock 100 including the Evol chamber 140, check valve 160, and a location adjustable end cap 460 is shown in accordance with an embodiment. In FIG. 4, the adjustment to actuator 155 will adjust the available volume of Evol chamber 140 in many more than just two available volume options and is made by moving end cap 460 axially along rod 142. For example, the rotation of rod 142 (or another control surface) will adjust the location of end cap 460 within Evol chamber 140. For example, in one embodiment, end cap 460 is shown in position Z such that the size of additional air volume 143 is relatively large. However, if end cap 460 is moved to position Y, X, or d (which could be any location along Evol chamber 140, could be preset, user configured, or the like), the size of the additional air volume 143 would be reduced. In so doing, each different position of end cap 460 would provide different available volumes which would result in different suspension stiffness characteristics.

In one embodiment, end cap 460 could also include a check valve 461 such that in cases of full air volume requirements, the flowpath through end cap 460 via the check valve 461 would allow utilization of the entire Evol chamber 140 to be utilized.

With reference now to FIG. 5, a cut away view of shock 100 including the Evol chamber 140 and showing the location adjustable check valve 160 and the location adjustable end cap 460 is shown in accordance with an embodiment. In FIG. 5, the adjustment to actuator 155 will adjust the available volume of Evol chamber 140 to include a number of option. For example, in addition to being able to move rod 142 to open or close check valve 160 to allow for the use of the entire Evol chamber 140 or block access to the additional air volume 143 of the Evol chamber 140; the rotation of rod 142 (or another control surface) will adjust the location of end cap 460 within Evol chamber 140 (as described in FIG. 4). For example, in one embodiment, end cap 460 is shown in position Z such that the opening and/or closing of check valve 160 opens or closes access to the entire additional air volume 143. However, if a finer adjustment were desired, end cap 460 could be moved along rod 142 to position Y, X, or d (which could be any location along Evol chamber 140, could be preset, user configured, or the like). In so doing, at each position the Evol chamber 140 would have a different volume and at each position, the opening or closing of check valve 160 would provide different volumes, which would result in different suspension stiffness characteristics.

In one embodiment, end cap 460 could also include a check valve 461 such that in cases of full air volume requirements, the flowpath through end cap 460 via the check valve 461 would allow utilization of the entire Evol chamber 140 to be utilized. Further, since it is end cap 460 that is moving and not check valve 160, if an event is realized where full closure to the Evol chamber 140 is needed, the check valve 160 would be closed and the location of end cap 460 would be irrelevant to the now reduced air volume of the suspension component 100.

In one embodiment, the adjustment to actuator 155 will adjust the available volume of Evol chamber 140 including a combination of (or all of) the options shown in FIGS. 2-5. That is, check valve 160 open or closing, moving the location of check valve 160, moving the location of end cap 460, the end cap 460 including a check valve 461, etc. In so doing, the adjustments to the available volume of Evol chamber 140 via actuator 155 can be almost infinite. Further, the ability to automate the movement and/or opening of the different components and valves can provide significant adjustment capability that can be provided at different times within a single span of a ride. Further, if an extreme event is realized, the entire volume of Evol chamber 140 could be automatically opened or closed using check valve 160 and/or check valve 461.

Thus, embodiments provide the ability to adjust the available volume of Evol chamber 140 on the fly (e.g., without requiring a teardown, the adding of additional air to Evol chamber 140, or the like).

For example, a rider is utilizing the suspension on a snowmobile and the rider has the suspension set up for a single rider (e.g., 140 lbs.). At some point, the rider invites a passenger to also enjoy the sled ride. However, with two riders on the sled, the weight is now (280 lbs.) and the suspension set-up would now be too soft. As such, the performance of the sled, range of motion of the sled, and other suspension related capabilities would be reduced.

In one embodiment, the rider (or passenger, or the sled automatically, or a combination thereof) would utilize actuator 155, via one or more of the embodiments above, to reduce the available volume of the Evol chamber 140. By reducing the available volume of Evol chamber 140 the suspension would be able to be stiffened to a comparable stiffness as the way it was set for the solo rider. As such, the performance, range of motion, and other suspension related capabilities would remain similar.

In one embodiment, when the passenger gets off of the sled, the rider (or sled automatically, or a combination thereof) would utilize actuator 155 to adjust the available volume of the Evol chamber 140 (again using one or more of the embodiments above) to return the sled to a stiffer single rider setting.

In one embodiment, the adjustment of the available volume of the Evol chamber 140 could also include a number of automated and pre-defined settings, such as for a single rider, two riders, three riders, towing, racing, working, distance versus short trip length, etc. For example, an adventurous rider might like a stiffer suspension setting while going out for a sporty ride, while a relaxed rider would desire a softer setting when taking the machine to town, etc. As such, when the adventurous rider gets on the sled, they would set actuator 155 (e.g., move the lever, hit a button, flip a switch, etc.) to reduce the available volume of the Evol chamber 140 for the stiffer ride (which may be predefined, or user set, a certain number of turns of a knob, etc.). Similarly, when a relaxed rider gets on the sled, they would set actuator 155 (e.g., move the lever, hit a button, flip a switch, etc.) to increase the available volume of the Evol chamber 140 for a softer ride (which may similarly be predefined, or user set, a certain number of turns of a knob, etc.).

In another embodiment, the adjustment to the available volume of the Evol chamber 140 could be automatically performed by actuator 155 during a ride. For example, if the rider was on flat terrain the available volume of the Evol chamber 140 would be initially set for a best rider comfort setting. However, if dramatic actions or increased performance inputs were noted, actuator 155 could automatically reduce the available volume of the Evol chamber 140 to provide a stiffer (more performance based) setting. Similarly, if rough terrain was encountered, actuator 155 could automatically increase the available volume of the Evol chamber 140 to provide a softer (more absorbing) setting. When the ride returned to the flat terrain, the actuator 155 could automatically adjust the available volume of the Evol chamber 140 to the initial settings.

Although the example utilizes a snow mobile, it should be appreciated that the same shock could be used in different vehicles such as, but not limited to a bicycle, motorcycle, ATV, jet ski, car, etc. Although a number of components are shown in the above figures, it should be appreciated that the components of the mid-sprocket assembly could be fixed or could be interchangeable. For example, a given gear ring could be changed, a plurality of gear rings could be changed, similarly, the countershaft, shift ring, cam pins, and the like could also be fixed or interchangeable to allow for different gearing scenarios, different gear numbers, etc. Further, one or more of the components could be adjusted, modified, removed, added, or exchanged for personal reasons, for performance reasons, for different applications (e.g., road, downhill, offroad, uphill, etc.), for different size bike frames, different crank arms, different chainring designs, and the like.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments could be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What I claim is:

1. A shock assembly comprising:
   a first fluid chamber;
   a second fluid chamber in fluid communication with said first fluid chamber via a flow path;
   a valve provided in said flow path to control a flow of a working fluid between said first fluid chamber and said second fluid chamber, wherein said valve has a first position and a second position, said valve fluidly isolating said second fluid chamber from receiving additional fluid from said first fluid chamber when said valve is in said second position, said valve allowing said first fluid chamber to receive fluid from said second fluid chamber even when said valve is in said second position;
   an actuator to control said valve, said actuator configured to adjust a location of said valve axially within said shock assembly such that a volume of said first fluid chamber is altered and such that a volume of said second fluid chamber is adjusted; and
   a rod disposed to couple said valve with said actuator.

2. The shock assembly of claim 1 wherein said valve allows said working fluid to flow through said flow path between said second fluid chamber and said first fluid chamber when said valve is in a first position.

3. The shock assembly of claim 1 wherein said valve stops a flow of said working fluid through said flow path from said first fluid chamber to said second fluid chamber when said valve is in said second position.

4. The shock assembly of claim 1 wherein said valve allows a flow of said working fluid through said flow path from said second fluid chamber to said first fluid chamber when said valve is in said second position.

5. The shock assembly of claim 1 wherein said valve is an active valve.

6. The shock assembly of claim 1 further comprising:
   a manually adjustable feature external to said shock assembly and coupled with said actuator,
      said manually adjustable feature to manually adjust said actuator such that an available volume of said first fluid chamber is modifiable to provide different damping characteristics for said shock assembly.

7. The shock assembly of claim 1 further comprising:
   a manually adjustable feature external to said shock assembly and coupled with said actuator,
      said manually adjustable feature able to manually adjust said actuator, while a vehicle utilizing said shock assembly is in operation, such that an available volume of said first fluid chamber is modifiable to provide different damping characteristics for said shock assembly.

8. The shock assembly of claim 1 further comprising:
an automatic adjustment feature coupled with said actuator,
said automatic adjustment feature to automatically adjust said actuator such that an available volume of said first fluid chamber is modifiable to provide different damping characteristics for said shock assembly.

9. The shock assembly of claim 1 further comprising:
an automatic adjustment feature coupled with said actuator,
said automatic adjustment feature to automatically adjust said actuator, while a vehicle utilizing said shock assembly is in operation, such that an available volume of said first fluid chamber is modifiable to provide different damping characteristics for said shock assembly.

10. An air shock assembly comprising:
a first air chamber;
a second air chamber in fluid communication with said first air chamber via a flow path;
a valve provided in said flow path to control a flow of air between said first air chamber and said second air chamber, wherein said valve has a second position, said valve fluidly isolating said second air chamber from receiving additional air from said first air chamber when said valve is in said second position, said valve allowing said first air chamber to receive air from said second air chamber even when said valve is in said second position; and
an actuator to control said valve, said actuator configured to adjust a location of said valve axially within said air shock assembly such that a volume of said first air chamber is altered and such that a volume of said second air chamber is adjusted.

11. The air shock assembly of claim 10 wherein said valve allows said air to flow through said flow path between second air chamber and said first air chamber when said valve is in a first position.

12. The air shock assembly of claim 10 wherein said valve stops a flow of said air through said flow path from said first air chamber to said second air chamber when said valve is in said second position.

13. The air shock assembly of claim 10 wherein said valve allows a flow of said air through said flow path from said second air chamber to said first air chamber when said valve is in said second position.

14. The air shock assembly of claim 10 wherein said valve is an active valve.

15. The air shock assembly of claim 10 further comprising:
a manually adjustable feature external to said air shock assembly and coupled with said actuator,
said manually adjustable feature to manually adjust said actuator such that an available volume of air for said first air chamber is modified to provide different damping characteristics for said air shock assembly.

16. The air shock assembly of claim 10 further comprising:
a manually adjustable feature external to said air shock assembly and coupled with said actuator,
said manually adjustable feature able to manually adjust said actuator, while a vehicle utilizing said air shock assembly is in operation, such that an available volume of air for said first air chamber is modified to provide different damping characteristics for said air shock assembly.

17. The air shock assembly of claim 10 further comprising:
an automatic adjustment feature coupled with said actuator,
said automatic adjustment feature to automatically adjust said actuator such that an available volume of air for said first air chamber is modified to provide different damping characteristics for said air shock assembly.

18. The air shock assembly of claim 10 further comprising:
an automatic adjustment feature coupled with said actuator,
said automatic adjustment feature to automatically adjust said actuator, while a vehicle utilizing said air shock assembly is in operation, such that an available volume of air for said first air chamber is modified to provide different damping characteristics for said air shock assembly.

19. An air shock assembly comprising:
a first air chamber;
a second air chamber in fluid communication with said first air chamber via a flow path; and
a valve provided in said flow path to control a flow of air between said first air chamber and said second air chamber,
said valve allows said second air chamber to be fluidly coupled with said first air chamber when said valve is in a first position,
said valve fluidly isolating said second air chamber from receiving additional air from said first air chamber when said valve is in a second position,
said valve allowing said first air chamber to receive air from said second air chamber even when said valve is in said second position; and
an actuator to control said valve, said actuator adjustable from a point external to said air shock assembly, said actuator configured to adjust a location of said valve axially within said air shock assembly,
said actuator to modify an available volume of air for said first air chamber to provide different damping characteristics for said air shock assembly.

20. The air shock assembly of claim 19 wherein, said actuator is further to modify an available volume of air for said first air chamber to provide different damping characteristics for said air shock assembly while a vehicle utilizing said shock air assembly is in operation.

* * * * *